(12) United States Patent
Pechstein et al.

(10) Patent No.: US 10,996,188 B2
(45) Date of Patent: May 4, 2021

(54) DEVICE FOR DETERMINING A MEASURAND CORRELATED WITH A CONCENTRATION OF AN ANALYTE IN A MEASURING MEDIUM, AND A METHOD

(71) Applicant: Endress+Hauser Conducta GmbH+Co. KG, Gerlingen (DE)

(72) Inventors: Torsten Pechstein, Radebeul (DE); Thomas Wilhelm, Chemnitz (DE); Michael Hanko, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 249 days.

(21) Appl. No.: 15/841,552

(22) Filed: Dec. 14, 2017

(65) Prior Publication Data
US 2018/0172619 A1    Jun. 21, 2018

(30) Foreign Application Priority Data
Dec. 20, 2016    (DE) .................... 10 2016 124 932.7

(51) Int. Cl.
*G01N 27/333* (2006.01)
*G01N 21/64* (2006.01)
(Continued)

(52) U.S. Cl.
CPC ...... *G01N 27/333* (2013.01); *B01L 3/502715* (2013.01); *G01N 21/6428* (2013.01);
(Continued)

(58) Field of Classification Search
CPC ............. G01N 27/333; G01N 27/4161; G01N 27/414; G01N 27/49; G01N 21/6428;
(Continued)

(56) References Cited

U.S. PATENT DOCUMENTS

| 2003/0224523 | A1 | 12/2003 | Thornberg et al. | |
| 2008/0116908 | A1* | 5/2008 | Potyrailo | G21C 17/022 324/721 |
| 2010/0203649 | A1* | 8/2010 | Thrier | G01N 31/225 436/127 |

FOREIGN PATENT DOCUMENTS

| CN | 103026210 A | 4/2013 |
| CN | 104246515 A | 12/2014 |

(Continued)

*Primary Examiner* — Robert J Eom
(74) *Attorney, Agent, or Firm* — Christopher R. Powers; Endress+Hauser (USA) Holding Inc.

(57) ABSTRACT

The present disclosure relates to a device in particular, a sensor for determining a measurand correlated with a concentration of an analyte in a measuring medium, including a housing that has a region provided for contacting the measuring medium, a fluid line arranged in the housing, an interface that is arranged within the region provided for contacting the measuring medium and has a first side which is in contact with the fluid line and a second side which is in contact with an environment of the housing in particular, with the measuring medium in contact with the housing, a first reservoir that is arranged in the housing and fluidically connected to the fluid line and which contains a reagent intended for contacting and/or interacting with the analyte, and a transport mechanism that is designed to transport reagent from the first reservoir into the fluid line.

8 Claims, 2 Drawing Sheets

(51) Int. Cl.
    *B01L 3/00*           (2006.01)
    *G01N 21/76*        (2006.01)
    *G01N 27/416*      (2006.01)
    *G01N 27/414*      (2006.01)
    *G01N 27/49*        (2006.01)
    *G01N 31/22*        (2006.01)

(52) U.S. Cl.
    CPC ....... *G01N 21/766* (2013.01); *G01N 27/4161* (2013.01); *B01L 2200/16* (2013.01); *G01N 27/414* (2013.01); *G01N 27/49* (2013.01); *G01N 31/221* (2013.01); *G01N 31/225* (2013.01); *G01N 2021/6432* (2013.01)

(58) Field of Classification Search
    CPC .. G01N 21/766; G01N 31/221; G01N 31/225; G01N 2021/6432; B01L 3/502715
    See application file for complete search history.

(56) References Cited

FOREIGN PATENT DOCUMENTS

| | | |
|---|---|---|
| CN | 104422720 A | 3/2015 |
| CN | 105973295 A | 9/2016 |
| EP | 0189316 A2 | 7/1986 |

\* cited by examiner

DEVICE FOR DETERMINING A MEASURAND CORRELATED WITH A CONCENTRATION OF AN ANALYTE IN A MEASURING MEDIUM, AND A METHOD

CROSS-REFERENCE TO RELATED APPLICATION

The present application is related to and claims the priority benefit of German Patent Application No. 10 2016 124 932.7, filed on Dec. 20, 2016, the entire contents of which are incorporated herein by reference.

TECHNICAL FIELD

The present disclosure relates to a device for determining a measurand correlated with a concentration of an analyte in a measuring medium using a regenerable sensor element.

BACKGROUND

Sensors are regularly used in analytical measuring to determine measurands correlated with the concentration of an analyte in a measuring medium such as the concentration or activity of the analyte, the concentration or activity of one or more substances that are chemically or biochemically converted into the analyte, or cumulative parameters that depend upon the concentration of several different analytes. Such sensors can be designed as in-line sensors which can be integrated in a process vessel containing the measuring medium and brought into direct contact with the measuring medium for example, by immersion. In-line sensors can be based upon a variety of measuring principles; for example, there are optochemical sensors, biochemical sensors, biological sensors, or electrochemical sensors.

Optochemical sensors frequently comprise an indicator substance which, for example, can be immobilized in a membrane that is brought into contact with the measuring medium for measurement. The detection of measured values by means of optochemical sensors is based upon the influence upon an optical property of the sensor by the interaction of an analyte with the indicator substance. Such an interaction can, for example, consist of a reversible or irreversible chemical reaction, with the participation of the analyte and the indicator substance, in which a reaction product is formed with certain optical properties, such as a specific absorption behavior or luminescence behavior, that are detectable by means of the sensor. A change in the optical properties of the sensor can also serve to change the absorption and fluorescence properties of an indicator substance, due to an interaction with the analyte, e.g., due to molecular collisions. One example is the extinguishing or attenuation of the fluorescence used in familiar oxygen sensors to measure dissolved oxygen (also termed fluorescence quenching).

Many optical sensors manifest a drift over their lifespan, which is associated with the aging of the indicator substance or a loss of the indicator substance, such as by a bleeding out (technically termed leaching) or radiation-induced bleaching (so-called photobleaching) of the membrane containing the indicator substance. This can be compensated for, if necessary, by regularly adjusting the sensor; however, this is associated with corresponding labor and servicing costs. The end of an optochemical sensor's life is reached when an adjustment is no longer sufficient to return the aging sensor to a state in which it emits reliable measured values over the entire desired measuring range. It is therefore desirable to counteract the aging and loss of the indicator substance, both in terms of avoiding more frequent and involved adjustments, and in light of extending the overall lifespan of the sensor.

Electrochemical sensors can, for example, be amperometric or potentiometric sensors.

Potentiometric sensors can detect the concentration or activity of electrically-charged analytes in particular, ions. They typically comprise a measuring half-cell and a reference half-cell, as well as a measuring circuit. In contact with the measuring medium, the measuring half-cell forms a potential that is a function of the activity of the analyte in the measuring medium, whereas the reference half-cell provides a stable reference potential independent of the analyte concentration. The measuring circuit is connected in an electrically-conductive manner to a conducting element of the measuring half-cell and a reference element of the reference half-cell, and generates a measuring signal that represents the difference in potential between the measuring electrode and reference electrode. The measuring signal may, if needed, be output by the measuring circuit to a higher-level unit, such as a measuring transducer, which is connected to the sensor and further processes the measuring signal.

The measuring half-cell potentiometric sensors comprise a potential-forming element, which may comprise, for example, an analyte-sensitive layer or an ion-selective membrane, depending upon the nature of the potentiometric sensor. When the layer or membrane comes into contact with the measuring medium, a difference in potential, which depends upon the difference between the activity of the analyte in the measuring medium and in the membrane, forms at the boundary surface between the layer surface or the membrane surface and the measuring liquid from the exchange of the analyte between the phases (such as the membrane and a liquid measuring medium) lying against the boundary surface. This determines the measuring half-cell potential that can be detected by the measuring circuit using the conducting element connected to the layer or membrane in an electrically or electrolytically conductive manner.

The ion-selective membrane or layer can, for example, comprise an ion exchanger or an ionophore that complexes the analyte. Such ion-selective membranes change the composition over the service life for example, by chemical reactions or by the loss of ionophore, which can exit from the membrane into the measuring medium. This can cause a drift in the sensor signal. Frequently, the lifespan of ion-selective sensors is also determined by aging, or the leaching of ionophore from the membrane. Some ion-selective membranes are so unstable in contact with measuring media that their use in process analysis, which requires consistently high measuring quality over long periods, is not to be recommended.

The reference half-cell of potentiometric sensors is frequently designed as an electrode of the second type, whose potential only indirectly depends upon the composition of the measuring medium in particular, upon the activity of the analyte in the measuring medium. An example of such a reference electrode designed as an electrode of the second kind is the silver/silver chloride electrode. The aforementioned reference element, connected to the measuring circuit, of the reference half-cell is in contact with a reference electrolyte. The reference element is made of a metal, wherein at least part of the surface of the reference element has a coating consisting of a poorly-soluble salt of the metal. The reference electrolyte is generally a saturated solution of this poorly-soluble salt. In addition, the reference electrolyte contains a high concentration of the anion of the poorly-soluble salt generally, in the form of an alkali salt. The potential of an electrode of the second kind depends upon the concentration of the cation of the poorly-soluble salt in the reference electrolyte. Due to the very high anion concentration in the reference electrolyte, the concentration of the cation of the poorly-soluble salt, and thus the potential of the reference electrode, remains basically constant. The reference electrolyte is accommodated in a chamber formed in a housing of a reference half-cell. The reference electrolyte must be in electrolytic contact with the measuring medium in order to perform a potentiometric measurement. This contact is established by a junction which may consist of, e.g., a hole that passes through the entire housing wall, a porous diaphragm, or a gap.

Components of the reference electrolyte can pass through the electrochemical junction into the measuring medium. In particular, the reference electrolyte can experience a depletion of alkali salt, which causes a drift of the reference electrolyte potential. It is also possible for foreign materials so-called electrode poisons from the measuring medium to pass through the junction into the reference electrolyte and lead to damage of the reference element. This also impairs the quality of potentiometric measurement.

Amperometric sensors frequently have a sensor inner chamber that is separated from the measuring medium by a sensor membrane and contains an inner electrolyte, as well as at least two frequently, also three electrodes arranged within the probe inner chamber. The electrodes are connected in an electrically-conductive manner to the measuring circuit. One of the electrodes functions as the measuring or working electrode, and an additional one functions as a counter electrode. The sensor membrane generally includes at least one functional layer, functioning as a diffusion barrier, through which the analyte is diffused from the measuring medium into the electrolyte chamber. The measuring circuit creates the measurement signal that represents the measurand, e.g., the analyte concentration, on the basis of a current flowing through the electrolyte between the measuring electrode and the counter electrode. In many amperometric applications, the potential of the measuring electrode or the current flow between the measuring electrode and the counter electrode through the inner electrolyte is regulated by means of a third reference electrode, through which current does not flow. Due to the flow of current through the inner electrolyte, a material reaction occurs on the electrodes such that the inner electrolyte changes its chemical composition, i.e., is consumed, over the service life of the sensor. This can, on the one hand, cause a drift in the sensor signal; on the other hand, the speed at which the electrolyte composition changes determines the lifespan of the amperometric sensor.

SUMMARY

It is therefore the aim of the present disclosure to provide sensors for analytical measurement in particular, in-line sensors of the above-described type that avoid the described disadvantages. In particular, the sensors are to have a longer lifespan and, in comparison to the sensors known from the prior art, less sensor signal drift, which is caused by aging or reagent loss.

This aim is achieved according to the present disclosure by the device according to claim 1, the method according to claim 8, the reference half-cell according to claim 9, and the method according to claim 13. Advantageous embodiments are presented in the dependent claims and in the present description.

The device according to the present disclosure for determining a measurand correlated with a concentration of an analyte in a measuring medium comprises:

a housing that has a region provided for contacting the measuring medium;

a fluid line arranged in the housing;

an interface that is arranged within the region provided for contacting the measuring medium and has a first side which is in contact with the fluid line and a second side which is in contact with an environment of the housing in particular, with the measuring medium in contact with the housing;

a first reservoir that is arranged in the housing and fluidically connected to the fluid line and which contains a reagent intended for contacting and/or interacting with the analyte; and a transport mechanism that is designed to transport reagent from the first reservoir into the fluid line.

The reagent can be a liquid in particular, a solution of a substance intended for contacting and/or interacting with the analyte. The measuring medium can, for example, be a measuring liquid or a measuring gas.

By enabling the transport mechanism to transport reagent from the first reservoir for example, as needed at regular time intervals or continuously into the fluid line, it is correspondingly possible, in the event of aging, consumption, or loss, to replace the reagent in contact with the first side of the interface with fresh reagent from the first reservoir, so as to enable an ongoing regeneration of the reagent and thereby counteract sensor signal drift. Adjustments therefore have to occur, if at all, much less frequently than with sensors according to prior art.

The device can have a sensor element that comprises the housing, fluid line, interface, and transport mechanism.

The interface serves to enable contact and/or interaction of the analyte with the reagent. It can, for this purpose, be permeable to the reagent and/or the measuring medium. It can also be semi-permeable, at least to the analyte, and/or selectively permeable only to the analyte. The interface can, for example, be a junction (technically termed a liquid junction), an electrochemical junction, an opening, or a diffusion barrier.

If the interface is designed as a diffusion barrier, the diffusion barrier can be permeable at least to the analyte, so that the analyte passes into the fluid line and there interacts with the reagent. The diffusion barrier can be permanently arranged between the reagent contained in the fluid line and the measuring medium. It can, for example, be a diaphragm in particular, consisting of ceramic a porous solid body, a filter material such as an open-pore filter fleece, a dialysis tube, a micro-structured component that establishes a fluidic connection between the measuring medium and reagent, or a membrane permeable at least to the analyte. A membrane permeable at least to the analyte can, for example, be a polymer membrane or a ceramic membrane that is, in particular, selectively permeable to the analyte.

The first side of the interface can be in contact with the fluid line such that it forms a part of the inner wall of the fluid line, and the reagent contained in the fluid line wets the first side of the interface.

The reagent intended to interact with the analyte can, for example, comprise an indicator substance which interacts with the analyte and thereby influences an optical measurand as a function of the analyte concentration or analyte activity.

Various forms of interaction between the reagent and analyte are conceivable. For example, the reagent can engage in an especially, irreversible chemical reaction with the analyte. A product of this reaction can, for example, have a measurable optical property by means of which the measurand can be determined. In this case, the reagent is consumed after a (single) interaction with the analyte and must be replaced by subsequent delivery of reagent from the first reservoir to the interface. In another embodiment, the reagent can reversibly interact with the analyte. An example of this is a region containing a luminescent indicator whose luminescence is attenuated by the analyte present (florescence quenching). In this case, the decrease in luminescence or its decay time, or measurands correlated therewith, is a measure of the analyte concentration or activity to be determined.

In the event that the analyte is an ion, the reagent can comprise an ion-selective liquid membrane and/or an ionophore. The interaction between the reagent and analyte then consists of an exchange of analyte ions across a boundary surface between the reagent and the measuring medium. If the interface is brought into contact with the measuring medium containing the analyte, a difference in potential forms, in the region of the boundary surface, i.e., at the interface between the measuring medium and the reagent contained in the liquid line, that depends upon the analyte concentration in the measuring medium. The reagent comprising the ionophore can, for its part, be in contact with an ion-selective membrane that contains a given concentration of the ionophore. The ion-selected membrane can form a wall region of the fluid channel opposite the interface. The side of the ion-selective membrane facing away from the fluid channel can be contacted by a conducting element in an electrically or electrolytically conductive manner, in order to measure a potential with respect to a reference half-cell.

In one embodiment, the reagent can comprise only a material that specifically interacts with an analyte, such as a luminescent dye whose luminescence is attenuated by the analyte, or an ionophore that specifically interacts with an ion. In another embodiment, the reagent can comprise several materials, each of which specifically interacts with the same analyte in different ways. In another embodiment, the reagent can contain a mixture of several materials that specifically react to different analytes. For example, the reagent can contain a mixture of pigments, wherein one of the pigments interacts with hydrogen or hydronium ions and thus enables the pH to be determined, and another of the dye molecules specifically interacts with oxygen and thus simultaneously allows the oxygen concentration in the measuring medium to be determined.

In addition, the reagent can contain materials for adjusting rheological properties.

The device can further comprise:
a measuring circuit that is designed to generate a measuring signal, correlated to the measurand, based upon the contact and/or interaction of the analyte with the reagent; and
sensor electronics that are designed to determine a measured value of the measurand by means of the measuring signal.

The device can, for example, be an optochemical sensor. In this case, the measuring circuit comprises a radiation source and a radiation receiver. The radiation source can be designed to radiate excitation radiation into the reagent that is located in the region of the interface and interacts with the analyte, in order to excite luminescence detectable by the radiation receiver whose intensity, phase angle, or decay time is dependent upon the measurand. An electrical measuring signal generated by the radiation receiver and correlated with the intensity, phase angle, or decay time accordingly represents the measurand. The sensor electronics can, for this purpose, be designed to determine a value of the measurand on the basis of the electrical measuring signal, e.g., using a for example empirically-determined assignment instruction saved in the sensor electronics.

The device can be a potentiometric sensor. In this embodiment, the housing, the fluid line, the interface, the first reservoir with the reagent, and the transport mechanism can be components of a measuring half-cell of the potentiometric sensor. In this embodiment, a difference in potential that is a measure of the measurand forms at a boundary surface of the device, e.g., between the interface designed as a diffusion barrier and the measuring medium, or a membrane in contact with the fluid line, which the analyte reaches through the interface and across the fluid channel, or at a surface of a drop entering the measuring medium from the fluid line or through the interface. The measuring half-cell further has a conducting element that is in contact with the boundary surface, e.g., the interface, or the membrane, or the drop, in an electrically or electrolytically conductive manner, and is connected to the measuring circuit in an electrically conductive manner. Moreover, the device has a reference half-cell in contact with a measuring medium in an electrically or electrolytically conductive manner, which is also connected to the measuring circuit. The measuring circuit is designed to detect a difference in potential between the reference half-cell and the conducting element and to output an electrical measuring signal that represents the measurand. The sensor electronics can, for this purpose, be designed to determine a value of the measurand on the basis of the electrical measuring signal, e.g., using a for example empirically determined assignment instruction saved in the sensor electronics.

Advantageously, the reference half-cell in this embodiment can also be designed according to the same principle as that of the device forming the measuring half-cell. This will be addressed in greater detail below.

The potentiometric measuring circuit can comprise several conducting elements, in order to be able to measure the concentration or activity of the analyte in a spatially resolved manner, e.g., at various positions along the fluid channel.

The device can also be designed as an amperometric sensor. In this case, the measuring circuit comprises two or three electrodes that are in contact in an electrically or electrolytically conductive manner with the reagent contained in the fluid channel and are connected to an amperometric or voltammetric measuring circuit. In this embodiment, the interface forms a diffusion barrier that lets the analytes selectively pass into the fluid line. The measuring circuit is designed to detect as the measuring signal a current which flows between two of the electrodes and depends upon the analyte concentration or analyte activity within the reagent. The sensor electronics can be designed to determine a value of the measurand on the basis of the electrical measuring signal, e.g., using an assignment instruction saved in the sensor electronics.

In other embodiments, the measuring circuit can be designed to perform capacitive measurements, or to perform impedance measurements. It is also possible for the device to comprise a combination of several measuring circuits, in particular, different from the types cited here.

The sensor electronics can be arranged in a separate electronics housing that is connected especially, again releasably to the housing. The connection between the electronics housing and housing can, for example, be realized by a plug-in connector. The sensor housing can be entirely or partially designed as part of a higher-level unit at a distance from the device, such as a measuring transducer, a portable operating unit, a computer, or a programmable logic controller that is connected to the measuring device for communication. The higher-level unit can also supply the measuring circuit, and possibly other components of the device such as the aforementioned transport mechanism, with energy.

The contact, permitted by the interface, between the analyte and reagent can be ongoing. Alternatively, the interface can, for example, be designed to allow the reagent to be only temporarily connected to the process medium, e.g., at regular intervals, or as needed, such as for an individual measurement. For this purpose, the interface can comprise a valve that selectively permits or blocks, depending upon the valve position, the connection between the measuring medium and reagent.

The reagent can directly contact the measuring medium across the interface, e.g., the interface can have an opening, or several openings that connect the surroundings of the housings and fluid line, from which the reagent exits into the measuring medium. The transport mechanism can be designed to transport the reagent from the fluid line across the interface into the surroundings of the housing. For example, pressure can be applied to the fluid line or the reservoir so that a drop of reagent exits the opening. The drop can have a diameter between 0.001 mm and 5 mm. To regenerate the reagent, the drop can dissolve in the measuring fluid and be replaced by a new drop consisting of fresh reagent. Drops can also be generated by a piezoelectric oscillator or with the assistance of a heating element that heats the water or solvent in the reagent. In the second case, a minute vapor bubble explosively forms which presses a drop of reagent into/out of the nozzle by its pressure.

In the case of a reagent that is released into the process by drops, the reagent can be designed so that it is, at least mostly, biodegradable or can be removed from the process. This can, for example, be achieved by means of sensorially functionalized magnetic particles.

The reagent can be adjusted thixotropically so that, on the one hand, it can be conveyed through the fluid line to the interface in a low-viscous state, but then come to rest on the opening of the interface as a drop in a more viscous state. To support reagent regeneration, the device can comprise an ultrasonic transducer, which can be actuated while transporting reagent to the interface in order to generate a low-viscous reagent state for separating the drop and subsequent delivery of reagent to the interface to form a new drop.

The device can further comprise a second reservoir, arranged in the housing, that is fluidically connected to the fluid line, and wherein the transport mechanism is designed to transport the reagent from the first reservoir through the fluid line into the second reservoir.

In this embodiment, the second reservoir therefore serves to hold used reagent. In this case, the used reagent can remain in the second reservoir. Advantageously, the first and second reservoirs are separated from each other by a mobile or flexible wall. If the reagent volume contained within the first reservoir decreases, the amount of reagent contained within the second reservoir correspondingly increases. The mobile or flexible wall can correspondingly compensate for these changes in volume in both reservoirs. To transport reagent from the first reservoir via the fluid line into the second reservoir, the transport mechanism can be designed to move or deform the movable or flexible wall. The transport apparatus can, for example, comprise a plunger serving as a movable wall, and a drive connected to the plunger.

The transport mechanism can be connected to an electronic control which is designed to control the transport mechanism to regenerate the reagent in contact with the interface. To the extent that the device comprises sensor electronics, they can be designed to control the transport mechanism and be connected thereto for controlling.

The transport mechanism can, for example, comprise a pressure difference generator, e.g., in the form of a pump. In one embodiment, in which the transport mechanism comprises a pump, it can be designed to adapt to the pressure predominating in the measuring medium. The device or transport mechanism can, for example, comprise a sensor that detects the flow of the reagent from the first reservoir, or the flow of the reagent through the fluid line. This sensor can be connected to a control of the transport mechanism in particular, the sensor control in order to output sensor signals correlated to the reagent flow to the control or sensor circuit.

The transport mechanism can also comprise a valve that optionally closes or connects the first reservoir to the fluid line, wherein an overpressure predominates in the first reservoir, and wherein the valve in an open state lets reagent escape from the first reservoir into the fluid line. The overpressure in the first reservoir can, for example, be generated by a connected hydraulic or pneumatic line, or by a fluid volume enclosed under pressure in the first reservoir, or by an elastic force acting on the wall of the first reservoir.

The sensor electronics can control the transport mechanism in different ways to regenerate the reagent contacting the interface, and thus regenerate the device or sensor, as follows. The reagent can, for example, be regenerated at the interface continuously. For this, the transport mechanism is designed to continuously and slowly transport the reagent through the fluid line until the first reservoir is empty. In an alternative embodiment, a regeneration can be discontinuous, wherein the reagent remains within the fluid line over a period in time, i.e., does not flow in particular, in the region of the fluid line comprising the interface. The duration until regeneration, i.e., until the reagent contained in the fluid line in the region of the interface is replaced with new reagent subsequently delivered through the fluid line, can be dictated to the sensor electronics. The duration can be determined by the sensor electronics on the basis of the conditions of use of the device, e.g., on the basis of the temperature to which the device is exposed, on the basis of the chemical composition of the measuring medium, or on the basis of other parameters influencing the reagent lifespan. The device can comprise sensors for determining such parameters. For example, the device can have a temperature sensor. Using the data from the temperature sensor, the sensor electronics can detect and evaluate temperature profiles. For example, they can determine whether the currently detected temperature profile corresponds to a cleaning or sterilization. Due to the great stress on the reagent constituted by a cleaning or sterilization procedure, the sensor electronics can be designed to regenerate the reagent in the region of the interface, directly after such procedures finish, by removing new reagent from the first reservoir and transporting it in the direction of the interface. Analogously, the control electronics can be designed to also identify other problematic influences on the reagent at the interface, and correspondingly perform a regeneration after such events occur.

The time point of regeneration can be dictated by the sensor electronics or a system superordinate to the sensor electronics, e.g., a higher-level data processing unit such as a transmitter, a mobile operating unit, or a programmable logic controller, on the basis of empirical values from specific measuring points.

The device can comprise a sensor that is designed to monitor the currently available amount of reagent in the first reservoir. This can, for example, be done by detecting a fill-level in the first reservoir, by detecting a fill-level in the second reservoir, or by monitoring a mass or a volumetric flow of reagent through the fluid line. The sensor electronics, or a higher-level unit connected to the sensor electronics, can be designed, on the basis of the sensor signals, to determine a time point from which a regeneration of the reagent by supplying fresh reagent from the first reservoir is no longer possible. The sensor electronics or the higher-level unit can be designed to output this time point or a corresponding message via a user interface.

The first reservoir and the second reservoir can be designed to be interchangeable. For example, the first reservoir can be contained in a cartridge which is insertable in the housing and fluidically connectible to the fluid line. In another embodiment, the housing can have a first housing module in which the first reservoir and the second reservoir are contained, and a second housing module that comprises the fluid line and the interface. The first and second housing modules can be releasably connected to each other such that, when the housing modules are connected, the first reservoir is fluidically connected to the fluid line, and, to the extent that the first housing module also comprises the second reservoir, the second reservoir is also fluidically connected to the fluid line. For this, the housing modules can each comprise fluid connectors which are complementary to each other. When the reagent contained in the first reservoir is consumed, it is therefore possible, on the one hand, to replace the first housing module with a new first housing module that comprises a first reservoir filled with still fresh reagent, in order to continue the measuring operation with the device. On the other hand, such an embodiment of the device enables a platform for the production of a wide range of sensors which each have identical second housing modules and a first module that is adapted to the measurand to be determined and has a corresponding reagent suitable for the measurand to be determined.

In an alternative embodiment, the first reservoir connected to the fluid line can also be arranged outside of the housing.

The cartridge, the first housing module, or the external reservoir can comprise information on the reagent; the analytical parameter to be determined by the reagent; a parameterization of a measuring circuit or measuring electronics used to determine the measurand; information on calculating the measured values, use-by data, batch numbers; and other information relating to the reagent or the measurement. The information can be saved in a memory element connected to the reservoir that, for example, can be read out by means of a reading device, and/or by means of a measuring circuit, and/or by means of the sensor electronics of the device. The information can alternatively also be saved on a unit remote from the device for example, on a server and/or in a cloud application. In this case, the cartridge, the first housing module, or the external reservoir can bear an ID, e.g., in the form of a machine-readable code or an RFID tag, by means of which a reading device, the measuring circuit, or a data processing apparatus, such as the sensor circuit, connected to the measuring circuit can retrieve the information from the remote unit.

Independently of whether it is exchangeable and/or arranged inside or outside of the housing, the first reservoir can be designed to be refillable, e.g., to have a coupling accessible from outside the housing for a fluid line, by means of which new reagent can be added to the first reservoir.

The first reservoir can have an integrated pressure compensating element for example, in the form of a gas bladder. This makes it possible to at least partially compensate for a build-up of an overpressure or underpressure due to a change in volume of the reagent contained in the first reservoir for example, because of the removal of the reagent for the first reservoir.

In an embodiment, the transport mechanism can be designed to transport reagent from the second reservoir back into the fluid line, and further into the first reservoir. The sensor electronics can be designed for the sensor to operate the device to continue detecting measured values of the measurand after the time point at which fresh reagent can no longer be transported from the first reservoir in the fluid line to the interface, wherein it transports reagent from the second reservoir back into the fluid line and back into the first reservoir for regeneration. The reagent in the second reservoir may be old and partially used from previous measurements, but, in certain circumstances, it can still be used for an operation to bridge a time period until fresh reagent is replenished in the first reservoir, or the first reservoir is exchanged with a reservoir filled with a fresh reagent. If needed, directly after the used reagent has started to be returned from the second reservoir back to the first reservoir, the device can be adjusted, once the reagent removed from the second reservoir enters the region of the transport line in contact with the interface. The adjustment can make it possible to perform measurements of sufficient quality even with the reagent removed from the second reservoir. Depending upon the nature of the reagent and upon the type and scope of the interaction of the reagent with the analyte, such as with reversible interactions, it is even possible to run several such reagent transport cycles from one reservoir into another and back, wherein an adjustment is performed at the beginning of each cycle.

The present disclosure also comprises a method for operating a device for determining a measurand correlated with a concentration of an analyte in a measuring medium in particular, according to one of the above-described embodiments comprising the following steps:

bringing into contact a region of a housing of the device, within which an interface, which has a first side which is in contact with a fluid line arranged within the housing, is arranged with the measuring medium such that a second side of the interface is wetted by the measuring medium;

transporting before or after the region is brought into contact with the measuring medium a reagent from the first reservoir arranged in the housing into the fluid line such that the reagent contacts the first side of the interface;

detecting, by means of a measuring circuit, measuring signals correlated with the measurand that are based upon the interaction of the analyte with the reagent; and continuously or intermittently replenishing the reagent in contact with the first side of the interface by subsequent delivery of reagent from the first reservoir into the fluid line.

Regeneration of the reagent contributing to the formation of the sensor signal, i.e., the reagent present in the fluid line in the region of the interface, can be performed in this manner, and a drift of the sensor signal due to signs of aging of the reagent, or loss of the reagent or reagent components, can accordingly be counteracted. At the same time, the lifespan of the device is thereby increased, in comparison to the sensors known from the prior art.

The present disclosure also relates to a reference half-cell in particular, for a potentiometric or amperometric sensor comprising:

a housing that has a region provided for contacting the measuring medium;

a fluid line arranged in the housing;

an interface that is arranged within the region provided for contacting the measuring medium and has a first side which is in contact with the fluid line and a second side which is in contact with an environment of the housing in particular, with the measuring medium in contact with the housing;

a first reservoir that is arranged in the housing and fluidically connected to the fluid line and which contains a first electrolyte;

a reference half-cell chamber, arranged in the housing, which contains a second electrolyte having, in particular, the same composition as the first electrolyte, and an electrically conductive reference element that contacts the second electrolyte and is connected to a contact site connected outside of the reference half-cell chamber;

a diffusion barrier which separates the reference half-cell chamber and the fluid line from each other such that a first side of the diffusion barrier is wetted by the first electrolyte contained in the fluid line, and which has a second side that is wetted by the second electrolyte; and a transport mechanism that is designed to transport electrolyte from the first reservoir into the fluid line.

The reference half-cell can further comprise a second reservoir, arranged in the housing, that is fluidically connected to the fluid line, wherein the transport mechanism is designed to transport the reagent from the first reservoir through the fluid line into the second reservoir.

The present disclosure also relates to a potentiometric sensor comprising a reference half-cell according to one of the above-described embodiments, and a measuring half-cell as well as a measuring circuit that is designed to detect a difference in potential predominating between the measuring half-cell and the reference element, and to generate a measuring signal that depends upon this difference in potential. The measuring half-cell can be a conventional potentiometric measuring half-cell, e.g., it can comprise a pH glass membrane as a potential-forming element, or an ion-selective membrane, or an ISFET chip.

In one embodiment, the measuring half-cell can comprise:

a housing that has a region provided for contacting the measuring medium;

a fluid line arranged in the housing;

an interface that is arranged within the region provided for contacting the measuring medium and has a first side which is in contact with the fluid line and a second side which is in contact with an environment of the housing in particular, with the measuring medium in contact with the housing;

a first reservoir that is arranged in the housing and fluidically connected to the fluid line and which contains a reagent intended for contacting and/or interacting with the analyte and, in particular, comprises an ionophore and/or a liquid membrane; and a transport mechanism that is designed to transport reagent from the first reservoir into the fluid line.

The present disclosure also comprises a method for producing a device, a reference half-cell, or a potentiometric sensor according to one of the embodiments described here, comprising:

the production of the housing of the device, the reference half-cell, or the potentiometric sensor, including, in particular, the reservoirs contained therein, fluid lines, chambers, interfaces, and diffusion barriers, by means of an additive production method such as 3-D printing; and filling the first reservoir.

BRIEF DESCRIPTION OF THE DRAWINGS

The present disclosure is explained in further detail below on the basis of the exemplary embodiments shown in the illustrations. In the figures.

DETAILED DESCRIPTION

Figure 1:
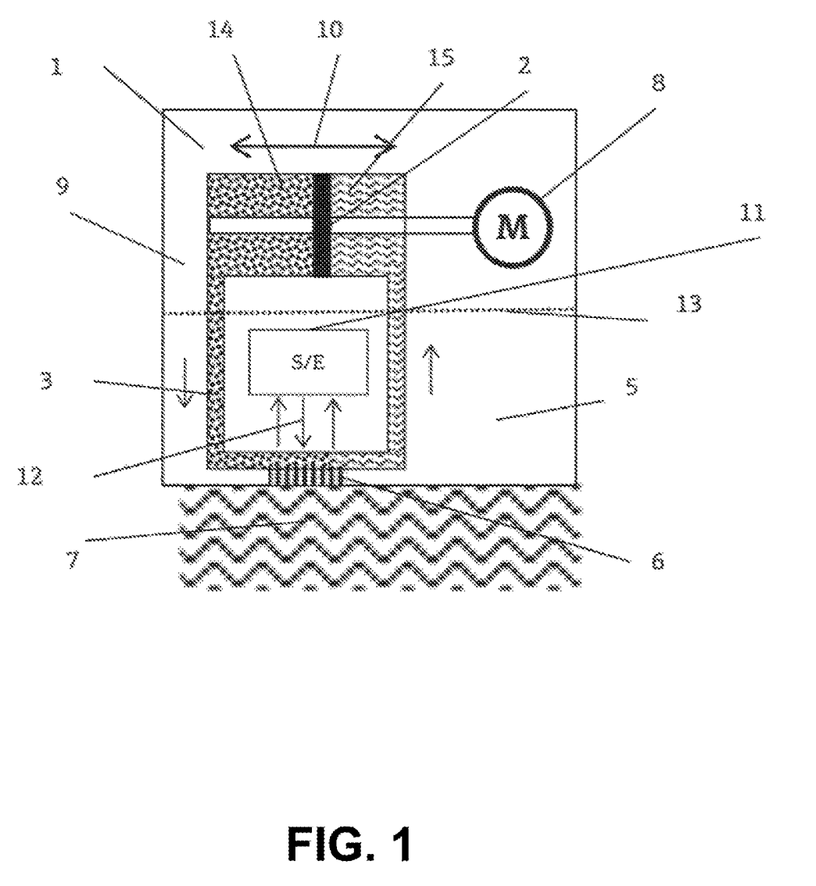
FIG. 1 shows an optochemical sensor according to the present disclosure.

FIG. 1 shows an optochemical sensor for determining a measurand correlated with a concentration of an analyte, in the present example, dissolved oxygen in a measuring fluid, such as a measuring gas or a measuring liquid.

The sensor comprises a housing 1 consisting, for example, of plastic, that has a region provided for contacting a measuring medium 7. In the example depicted here, this region is, for example, a face of the housing 1. The housing 1 encloses a fluid structure that comprises a first reservoir 14, a fluid line 3 fluidically connected to the first reservoir 14, and a second reservoir 15 fluidically connected to the fluid line 3. The fluid line 3, the first reservoir 14, and the second reservoir 15 can, for example, be designed to be microfluidic. The fluid line 3 can be designed as a channel structure, but can, however, also comprise sections that have an expanded cross-section. The first reservoir 14 and the second reservoir 15 are separated from each other by a common wall 2 that is designed to be movable, so that the ratio of the volumes of the first reservoir 14 and second reservoir 15 relative to each other can be adjusted by the position of the wall 2. In the present example, the wall 2 is designed as a movable, liquid-tight plunger lying against a common peripheral wall of the first and second reservoirs 14, 15. The wall 2 in the present example is connected to a drive 8 comprising a stepping motor that is designed to optionally move the wall 2 toward the first reservoir 14 while reducing the volume of the first reservoir 14 and increasing the volume of the second reservoir 15, or in the opposite direction, i.e., toward the second reservoir 15, while reducing the volume of the second reservoir 15 and increasing the volume of the first reservoir 14 (cf. direction arrow 10).

The first reservoir 14 contains a reagent that is intended to interact with the analyte contained in the measuring medium 7. In the present example of an optochemical sensor, the reagent can, for example, be a fluorescent dye present in the liquid, which can be excited to emit fluorescent radiation, and whose fluorescence is attenuated by interacting with the analyte. The movable wall 2 and the drive 8 serve as a transport mechanism for transporting reagent from the first reservoir 14 into the fluid line 3. This transport can be effected by moving the wall 2 toward the first reservoir 14.

In the region provided for contacting the measuring medium 7, the housing wall of the housing 1 has an interface 6 which, in the present embodiment, serves as a diffusion barrier between the fluid line 3 and the measuring medium 7. In the present example, the interface 6 comprises a polymer membrane permeable to the measuring medium. Along with the measuring medium, the analyte dissolved oxygen in the present example passes through the interface 6 into the region of the fluid line 3 bordering the interface 6. The reagent contained in the fluid line 3 in the region of the interface 6 can, accordingly, interact with the analyte. The reagent contained in the region of interface 6 can be transported further through the fluid line 3 toward the second reservoir 15 by an additional movement of the wall 2 toward the first reservoir 14. With this movement of the wall 2, room is simultaneously created in the second reservoir 15 for receiving the reagent that has been transported further.

The sensor further comprises a measuring circuit 11 for optical measurements. In the present example, this can comprise a radiation source that emits excitation radiation 12 at a wavelength by means of which the fluorescent dye contained in the reagent can be excited to emit fluorescence. The measuring circuit 11 further comprises a radiation receiver that comprises one or more photoelectric detection elements such as photodiodes or CCD elements, which are designed to generate an electrical signal that depends upon the intensity or a phase angle of received measuring radiation. In the present example, the radiation source is oriented with respect to the region of the fluid channel 3 adjoining the interface 6 such that at least part of the excitation radiation 12 emitted by the radiation source strikes this region. The radiation receiver is oriented with respect to the region of the fluid channel 3 adjoining the interface 6 such that the fluorescence radiation emitted in this region by the dye molecules contained in the reagent strikes the radiation receiver. Accordingly, a measuring signal based upon the interaction of the reagent with the analyte is detectable by means of the measuring circuit 11, i.e., the measuring signal representing the quenching of the fluorescence under the influence of oxygen, which is simultaneously a measure of the analyte concentration in the measuring medium. The measuring circuit 11 can, moreover, be designed to generate, prepare, or further process the measuring signal.

The measuring circuit 11 can, for communication, be connected to a higher-level unit such as higher-level sensor electronics, a measuring transducer, a computer, a portable operating unit, or a programmable logic controller. Advantageously, the higher-level unit can also be connected to supply the measuring circuit 11 with energy.

The higher-level unit can furthermore be connected to the drive 8, to control the transportation of reagent through the fluid channel 3 and, if need be, supply it with energy. The higher-level unit can, in particular, be designed to coordinate, e.g., synchronize, the transportation of reagent through the fluid channel 3 with the detection of measured values by means of the measuring circuit 11.

In the present example, the housing 1 is made of two modules, 5 and 9. The first module 5 comprises the measuring circuit 11, the interface 6, and the region of the fluid line 3 in direct contact with the interface 6, as well as other parts of the fluid line 3. The second module 9 comprises the first and second reservoirs 14, 15, the movable wall 2, and the drive 8 serving to move the wall 2. The two modules 5 and 9 are releasably connected to each other by a module interface 13, wherein the reservoirs are connected to the fluid line 3 by fluid connectors, known per se, that ensure a fluidic connection of the reservoirs 14, 15 to the fluid line 3. This modular sensor structure has numerous advantages. On the one hand, it is possible to replace the housing module 9 with a housing module of the same design which contains new reagent in its first reservoir. Accordingly, even when the reagent contained in the first reservoir 14 is largely or completely consumed, the sensor depicted here can still be operated, by replacing the housing module 9 with such a housing module of the same design. It is also possible to retrofit the sensor by exchanging the housing module 9 with another housing module for determining another measurand, e.g., in that the other housing module contains a reagent in its first reservoir that interacts with another analyte and whose optical properties influence the interaction with the other analytes.

The embodiment described here also offers a platform solution for the production of a wide range of sensors, which each have identical housing modules 5 and a module 9 that is adapted to the measurand to be determined and has a corresponding reagent suitable for the measurand to be determined.

The sensor described here can be regenerated by transporting fresh reagent from the first reservoir 14 into the region of the fluid line 3 adjoining the interface 6. If the reagent in this region ages for example, by chemical reactions with measuring medium 7 or if it loses dye for example, from bleaching or the discharge of dye across the interface 6 to the outside into the measuring medium, fresh reagent can be transported by the drive 8 through the fluid line 3 toward the interface 6. At the same time, the used reagent is removed from this region and passes into the second reservoir 15. Measuring can then be continued with the fresh reagent.

Once the first reservoir 14 is completely or almost completely drained, it is possible to still continue operating the sensor. In this case, the drive 8 can move the movable wall 2 in the opposite direction, i.e., in the direction of the second reservoir 15, and thereby transport already used reagent from the second reservoir 15 back into the fluid line 13 and to the region of the fluid line adjoining the interface 6. In this case, measuring is thus performed with the already used reagent. The sensor signal in this case may not be as reliable as when measuring with fresh reagent. It is, however, at least possible to maintain emergency operation. In many cases, by means of a calibration or adjustment performed with the already used reagent, it is also possible to achieve measured values of sufficient quality, even with the already used reagent removed from the second reservoir 15. Several cycles can even be run, if necessary, in which the reagent is alternatively transported from the first to the second reservoir and from the second reservoir back to first reservoir, wherein a calibration or adjustment is performed before each cycle. This significantly extends the useful life of the sensor beyond normal livespans of conventional optical sensors.

To produce the sensor portrayed in FIG. 1, an additive method such as 3-D printing can be used to generate a housing 1 and the fluid formed therein, as well as the interface 6.

Figure 2:
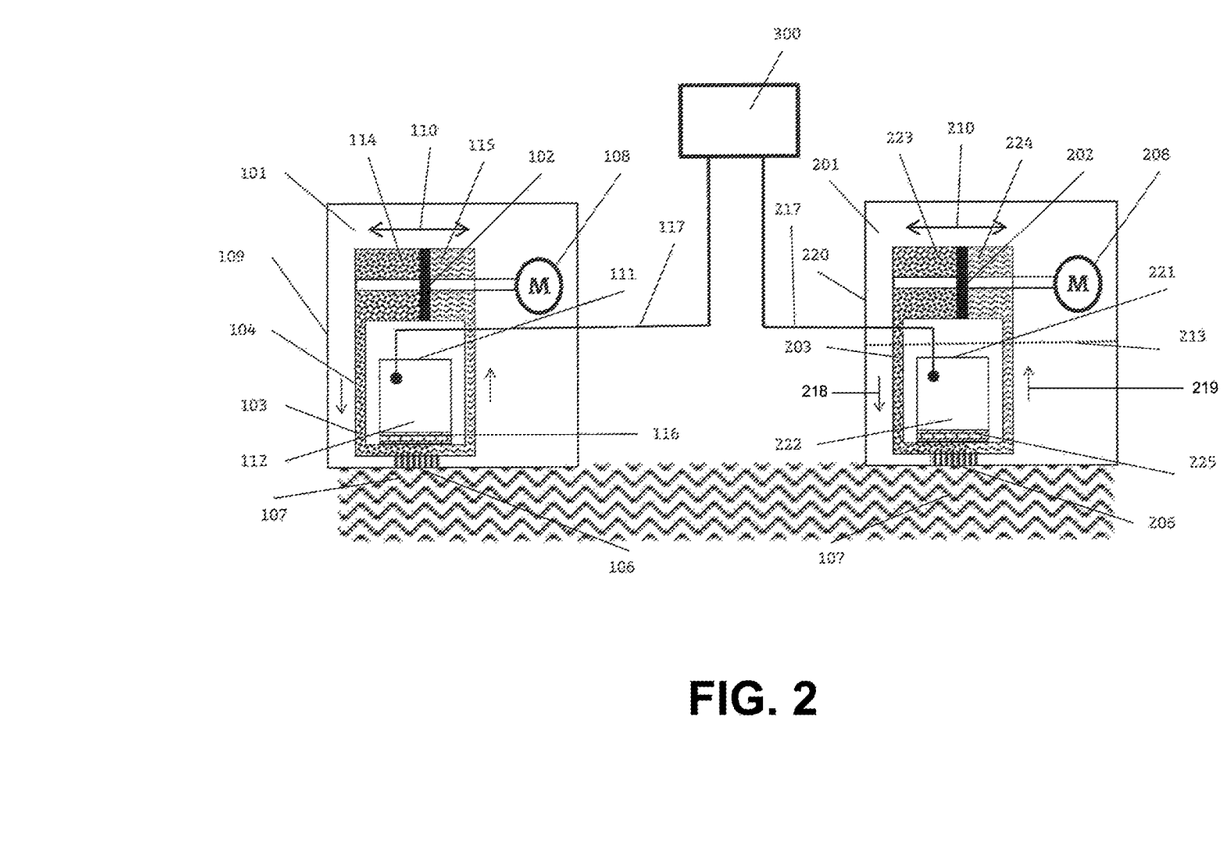
FIG. 2 shows a potentiometric sensor with a measuring half-cell and a reference half-cell according to the present disclosure.

FIG. 2 shows a potentiometric sensor with an ion-selective measuring half-cell 109 and a reference half-cell 220. Just like the optochemical sensor portrayed in FIG. 1, the measuring half-cell 109 has a housing 101, made, for example, of plastic, in which is arranged a first reservoir 114, a second reservoir 115, and a fluid line 103 fluidically connected to the first and second reservoirs 114, 115. The housing 101 has a region, provided for contacting the measuring medium 107, in which an interface 106 is arranged that has a first side touching the measuring medium 107 and a second side facing away from the measuring medium 107. The side of the interface 106 facing away from the measuring medium is in contact with the interior of the fluid line 103. In the present example, the interface 106 is designed as a diffusion barrier, such as a porous membrane, that lets the measuring medium 107 with the analyte arranged therein pass through.

An ion-selective membrane 116 which comprises an ionophore is arranged on a side of the fluid line 103 opposite the interface. The ion-selective membrane 116 seals a chamber 112 that is arranged in the housing 101 and contains an inner electrolyte, which, for example, can be a buffer solution with a known concentration of the analyte. The inner electrolyte is contacted by an electrically conductive in particular, metallic conducting element 117, such as a chlorided silver wire, which runs out of the chamber 112 and is connected in an electrically conductive manner to a measuring circuit 300.

A reagent is contained in the first reservoir 114 that comprises the ionophore contained in the ion-selective membrane 116. Like the sensor according to FIG. 1, the ion-selective measuring half-cell 109 of the present example has a transport mechanism for transporting reagent from the first reservoir 114 into the fluid line 103, and, in particular, into the region of the fluid line 103 adjoining the interface 106 and the ion-selective membrane 116. The transport mechanism comprises a movable wall 102 that separates the first reservoir 114 from the second reservoir 115. The movable wall 102 can be moved by a drive 108 along the directions indicated by the directional arrow 110, to selectively reduce the volume of the first reservoir 114 and simultaneously increase the volume of the second reservoir 115, and thereby cause reagent to be transported from the first reservoir 114 to the second reservoir 115, or to reduce the volume of the second reservoir 115 and simultaneously increase the volume of the first reservoir 114, and thereby cause reagent to be transported from the second reservoir 115 back to the first reservoir 114.

When the half-cell 109, or the potentiometric sensor with the half-cell 109, is in measuring mode, reagent can be transported by this transport mechanism continuously, or at given intervals, or as needed, into the region of the fluid line 103 adjoining the membrane 116 and the interface 106, and thereby regenerate the ion-selective measuring half-cell 109 by replenishment with fresh ionophore.

The reference half-cell 220 can be regenerated analogously to the measuring half-cell 109. It has a housing 201 in which is arranged a first reservoir 223, a second reservoir 224, and a fluid line 203 fluidically connected to the first reservoir 223 and the second reservoir 224. An aqueous electrolyte with a high concentration of KCl, such as 3M KCl, and a given concentration of AgCl are contained in the first reservoir 223. The first reservoir 223 and the second reservoir 224 are separated from each other by a wall 202 that can be moved back and forth along the directions indicated by the directional arrow 210 by a drive 208 and, just as with the reservoirs of the measuring half-cell 101, can, accordingly, cause the first reservoir 223 to be reduced and the second reservoir 224 to be simultaneously enlarged while transporting reagent through the fluid line 203, or cause the first reservoir 223 to be enlarged and the second reservoir 224 to be simultaneously reduced while transporting reagent through the fluid line 203 in the opposite direction.

In a region of the housing 201 intended for immersion in the measuring medium 107, an interface 206 is arranged which has a first side that is in contact with the measuring medium 107, and a second side that is in contact with the interior of the fluid line 203. The interface 206 can have at least one opening through which material can be exchanged between the electrolyte contained in the fluid line 203 and the measuring fluid 107. For example, the interface 206 can be made of a porous, ceramic body.

On the side of the fluid line 203 opposite the interface 206, a diffusion barrier 225 is arranged that, for example, can be designed as a fluid-permeable diaphragm or an electrically conductive diffusion barrier, such as in the form of a metallic body, e.g., a platinum pin. This diffusion barrier 225 is to enable a charge transport, but an exchange of material does not necessarily have to occur. The diffusion barrier 225 can therefore, for example, be made of electrically conductive metal such as silver or platinum. The diffusion barrier 225 seals a housing chamber 222 that contains a reference electrolyte which has the same composition as the electrolyte contained in the first reservoir 223. The reference electrolyte is contacted by a reference element 217 that is connected to the measuring circuit 300 in an electrically conductive manner. In the present example, the reference element 217 is a chlorided silver wire.

By the exchange of material between the measuring medium 107 and the electrolyte contained in the fluid line 203, a charge transport is possible, by transporting ions across the interface 206. On the other hand, this can, however, lead to a depletion of chloride in the electrolyte, or to a contamination of the electrolyte by foreign substances entering the fluid line 203. In measuring mode, the electrolyte from the first reservoir 223 is transported through the fluid line 203 along the direction of the arrows 218, 219 by means of the transport mechanism formed by the movable wall 202 and the drive 208. In this manner, a drift of the reference half-cell 220 potential arising from a change in the composition of the electrolyte is counteracted.

The measuring circuit 300 is designed to detect a difference in potential between the conducting element 117 and the reference element 217, which are each connected to a high-ohm input of the measuring circuit 300. Since the reference half-cell 220 potential is constant and, especially, independent of the analyte activity in the measuring fluid 107, whereas the potential of the measuring half-cell 109 is exclusively determined by the analyte activity in the measuring medium 107, except for negligible cross-sensitivities, the difference in potential detected by the measuring circuit 300 is a measure of the analyte activity in the measuring medium 107. Moreover, the measuring circuit 300 is designed to generate and output a difference in potential and, accordingly, a measuring signal representing the analyte activity. It can be connected to a higher-level unit such as a measuring transducer, an in particular, portable operating unit, a computer, or a programmable logic controller. The higher-level unit can also be designed to control the drives 108 and 208.

In the present example, the reference half-cell 220 consists of two modules that are releasably connected to each other by the connecting point. The modules can be designed analogously to the modules 5 and 9 described with reference to FIG. 1. With this design, the first and second reservoirs 223, 224 can be replaced from time to time, in order to provide fresh electrolyte to the reference half-cell 220.

To perform a measurement of the measurand, the measuring half-cell 109 and the reference half-cell 220 are brought into contact with the measuring fluid 107, and measuring signals are determined by means of the measuring circuit 300. The drives 108 and 208 can be controlled so that reagent is continually resupplied by the fluid line 103, and reference electrolyte is continually resupplied by fluid lines 103, 203, to the regions of the fluid lines 103, 203 comprising the respective interface 106, 206. This makes it possible to regenerate the reagent present in the region of the interface 106 and the reference electrolyte present in the region of interface 206, which can be done continuously, or at regular time intervals, or as needed. The detection of measured values and the transportation of reagent and reference electrolyte can be synchronized.

For a person skilled in the art, many other embodiments and combinations of the embodiments described here are discernible as belonging to the present disclosure.

For example, in one embodiment of the present disclosure, a potentiometric sensor can have a measuring half-cell that is designed like the measuring half-cell 109 shown in FIG. 2, whereas the reference half-cell is designed as a conventional reference half-cell of the second kind, e.g., as a silver/silver chloride electrode.

In another embodiment of the present disclosure, a potentiometric sensor can comprise a conventional measuring half-cell, such as a pH measuring half-cell with an ISFET chip, or a pH-sensitive glass membrane, or an ion-selective electrode with a conventional solid state or liquid membrane, whereas the reference half-cell is designed like the reference half-cell 220 shown in FIG. 2.

The invention claimed is:

1. A device for determining a measurand correlated with a concentration of an analyte in a measuring medium, the device comprising:
   a housing having a region adapted for contacting the measuring medium;
   a first fluid line disposed in the housing and configured to enable a determining therein of the measurand in the measuring medium;
   an interface disposed within the region of the housing, the interface including a first side in contact with the first fluid line and a second side in contact with an exterior of the housing such that the second side of the interface is arranged to contact the measuring medium in contact with the housing, in operation;
   a first reservoir disposed in the housing and fluidically connected to the first fluid line via a second fluid line, the first reservoir containing a reagent composed to interact with the analyte in the measuring medium in the first fluid line as to enable the determining of the measurand in the first fluid line via a measuring element; and
   a transport mechanism structured to transport reagent from the first reservoir into the first fluid line via the second fluid line and configured to continuously or intermittently replenishing the reagent in contact with the first side of the interface by subsequent delivery of reagent from the first reservoir into the first fluid line.

2. The device of claim 1, further comprising:
   a measuring circuit configured to generate a measuring signal correlated to the measurand based upon the contact and/or interaction of the analyte with the reagent, the measuring circuit comprising the measuring element; and
   sensor electronics configured to determine a measured value of the measurand using the measuring signal.

3. The device of claim 1, further comprising a second reservoir disposed in the housing and fluidically connected to the first fluid line via a third fluid line, wherein the transport mechanism is embodied to transport the reagent from the first reservoir through the first fluid line into the second reservoir.

4. The device of claim 1, wherein the interface is a diffusion barrier that is permeable at least to the analyte, such that the analyte passes into the first fluid line and there interacts with the reagent.

5. The device of claim 1, wherein the interface has one or more openings connecting the exterior of the housing and the first fluid line, and wherein the transport mechanism is embodied to transport the reagent from the first fluid line via the interface to the exterior of the housing.

6. The device of claim 1, wherein the device is an optochemical sensor, and wherein the interaction of the reagent with the analyte causes a change in an optical property of the reagent.

7. The device of claim 1, wherein the reagent includes a flourescent dye or an ionophore.

8. A device for determining a measurand correlated with a concentration of an analyte in a measuring medium, the device comprising:
   a housing having a region adapted for contacting the measuring medium;
   a first fluid line disposed in the housing and configured to enable a determining therein of the measurand;
   an interface disposed within the region of the housing, the interface including a first side in contact with the first fluid line and a second side in contact with an exterior of the housing such that the second side of the interface is arranged to contact the measuring medium in contact with the housing in operation;
   a first reservoir disposed in the housing and fluidically connected to the first fluid line via a second fluid line, the first reservoir containing a reagent composed to interact chemically or optochemically with the analyte in the measuring medium in the first fluid line as to enable the determining of the measurand via a measuring element; and
   a transport mechanism structured to transport reagent from the first reservoir into the first fluid line via the second fluid line and configured to continuously or intermittently replenishing the reagent in contact with the first side of the interface by subsequent delivery of reagent from the first reservoir into the first fluid line.

* * * * *